No. 665,962. Patented Jan. 15, 1901.
J. D. GRACE.
APPARATUS FOR MAKING TEA OR COFFEE.
(Application filed Sept. 6, 1900.)
(No Model.)
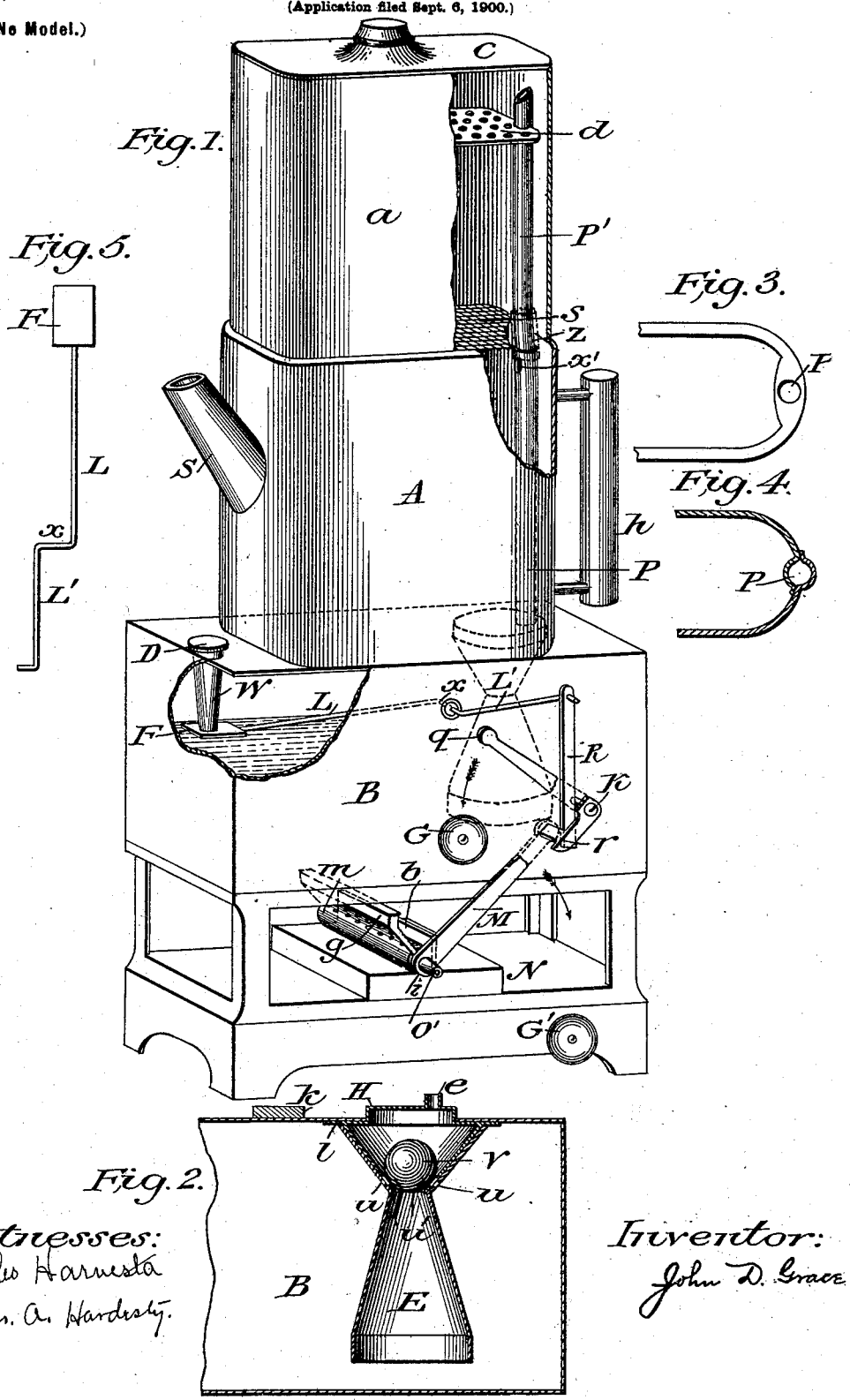
Witnesses:
Charles Harnesta
Chas. A. Hardesty.
Inventor:
John D. Grace
THE NORRIS PETERS CO., PHOTO-LITHO., WASHINGTON, D. C.

UNITED STATES PATENT OFFICE.

JOHN D. GRACE, OF NEW ORLEANS, LOUISIANA.

APPARATUS FOR MAKING TEA OR COFFEE.

SPECIFICATION forming part of Letters Patent No. 665,962, dated January 15, 1901.

Application filed September 6, 1900. Serial No. 29,194. (No model.)

*To all whom it may concern:*

Be it known that I, JOHN D. GRACE, a citizen of the United States, residing at New Orleans, in the parish of Orleans, State of Louisiana, have invented a new and useful Improvement in Apparatus for Making Tea or Coffee, of which the following is a specification.

The purpose and object of my invention are to make tea and coffee by the use of a mechanism operating automatically, wherein the water is boiled and in a proper manner discharged into the proper vessel under cover, thus retaining strength lost by tea and coffee when made in a vessel opened at the top. After the required quantity of tea or coffee is made, the flame under the boiler is extinguished and a signal is sounded by a bell to indicate that the process is completed, all done automatically. I attain this by means of the mechanism illustrated in the accompanying drawings, forming part of this specification.

Similar letters of reference in the several figures refer to like parts.

Figure 1 is a view in perspective of the mechanism with various parts in place and showing also interior views of some parts. Fig. 2 is a vertical sectional view of escape-pipe E with valve $v$ and sleeve H, openings $u$ and $u$ in escape-pipe, openings $u'$ and $u'$ in sleeve H, and nipple $e$, collar $l$. Fig. 3 is a bottom view of vessel A, with passage P constructed in the side thereof, this being particularly adapted to such vessels when made of porcelain, &c. Fig. 4 is a sectional view of shell of vessels A and $a$ when of metal, showing water-passage P, formed by lapping edges. Fig. 5 is lever mechanism with float F for the operation of release rod or bar R, and to close bottom opening of supply-pipe $w$.

In the aforesaid drawings, A (with spout S and handle $h$) represents the vessel, in which tea may be made and into which coffee may drip from the upper vessel or dripper $a$. In the upper vessel $a$ is contained a perforated plate $d$, on which hot water is poured and by it distributed over the ground coffee lying between it and strainer $s$. In these respects the two vessels A and $a$, with the exception of conduits P and P', are in design and operation similar to the common coffee-pot long in general use for making dripped coffee; but to get the best results obtainable by the use of such pots it is necessary to pour water in the top vessel in small quantities at a time, a tedious process now accomplished by hand, and as this is done with the cover off much of the coffee's strength is lost and its flavor impaired. To obviate this, I combine with these two vessels A and $a$, a passage-way pipe, or conduit P and P' for water sent automatically from the boiler B in small quantities at a time up through conduit P and P' and discharged under cover onto perforated plate $d$, from which it finds its way down and through the ground coffee and drips into vessel A, ready to be served.

The boiler B contains a pipe $w$, through which the necessary water for making tea or coffee is supplied, and is provided with a loose cap D, placed thereon and of sufficient weight to remain unmoved by steam of such pressure necessary for the proper operation of the mechanism, but light enough to answer the purpose of a safety-valve in event the steam-pressure should in some manner rise beyond the point of absolute safety. The lower end of this supply-pipe $w$ is suspended at the proper water-level to which the boiler should be filled, and as the water poured into the boiler reaches that level a float F closes the bottom opening of pipe $w$ by contact therewith. This float is made to answer a still further purpose. It is connected to one end of lever L, which with the outside portion of said lever (designated L') operates a release bar or rod R. As the boiler-water level lowers float F lowers with it, carrying down that end of lever attached thereto, thereby causing the other end L' to rise. To the outside end L' release rod or bar R is attached and is raised as float F lowers. The lower end of release bar or rod R is pressed against bell-crank-lever pivot K by a spur or heel projection on the lower end of lever $r$ extending toward the boiler. As the lower end of rod R is raised, as aforesaid, high enough to clear this projection, the lever is released and swings downward, hammer $q$ striking gong G, signaling that the process is completed. Lever M is made to rest against bell-lever $r$, and therefore as the bell-lever is released, as aforesaid, lever M is also released, and as it is released it turns cock $i$, which forms its axis, shutting off the gas, if gas be used, and if oil-lamp N be used extinguishes the flame therefrom by drawing cap $g$ over it. Cock $i$ is provided with nipple $o'$ for gas-hose.

An important feature in this mechanism is the combination of valve $v$ with escape-pipe E, provided with openings $u$ and $u$ in that part of pipe lying in the steam-space designed to control the flow of water from the boiler. While permitting a constant flow of water when openings $u$ and $u$ are covered, as in process of making tea, it will cause the water to pass out in small quantities at a time, as in process of making dripped coffee, when openings $u$ and $u$ are uncovered, permitting escape of live steam, as hereinafter mentioned.

The escape-pipe E is secured to top of boiler B by means of collar $l$, causing upper part of sleeve H to project above surface of boiler. The lower end of escape-pipe E is suspended above the bottom of boiler. Inside of this escape-pipe and in that part suspended in the steam-space a valve $v$ is placed. Fig. 2 shows a "ball-valve;" but any style valve may be used. Through the escape-pipe and at the point where valve $v$ is located one or more openings are made, ($u$ and $u$.) In the upper part of escape-pipe a sleeve H is fitted with openings therein ($u'$ and $u'$) corresponding to those in escape-pipe $u$ and $u$. This sleeve is provided for purpose of closing steam-spaces $u$ and $u'$ from outside of boiler at will of attendant and is done by giving the sleeve a slight turn.

For the purpose of affording a level base for pot A on the top of boiler B slight elevations or one or more supporting or base blocks $k$ should be placed corresponding to the height of sleeve H. In the top of sleeve H a nipple $e$ is provided to engage the lower end of the conduit, pipe, or passage P, affording a passage for water from escape-pipe to conduit P. These elevations may be dispensed with if sleeve H be countersunk, leaving only nipple $e$ extending above the surface of the boiler. In vessel A conduit P may terminate at such distance below top of vessel to permit water to overflow into that vessel under cover, as in process of making tea; but if conduit P be carried to top of vessel A then an opening $x'$ for discharge of water should be made in side thereof, this opening to be near enough to the top to be closed by a union-joint (indicated by dotted lines $z$) connecting conduits P and P' or by lower extension of P', which for connecting with P may be carried sufficiently far below bottom of dripper $a$.

Passage-ways, pipes, or conduits P and P' may be constructed in vessels made of metal by lapping the edges, as in Fig. 4, and in vessels of earthenware may be made in the side, as in Fig. 3. I prefer to place the pipes or conduits P and P' as illustrated in the several drawings. The pipes P and P' may be placed at any point in the interior of either vessel, as well as along the sides or shell of vessel.

The cylinder $m$ is perforated for use of gas for heating purposes. For the larger-sized pots two such cylinders should be provided, both communicating with cock $i$. They should be arranged so as to allow lamp N, burner $b$, to occupy position under the boiler, so as to utilize extinguisher $g$. To this end the cylinders forming a gas-stove could be placed parallel and far enough apart to permit lamp-burner $b$ to extend up between them.

The levers L and L', with axis $x$, may be made in one piece. Float F should be secured to lever L in any manner permitting it to float fairly on the water, while the lever is at an angle therewith. The connection is preferably made in the center of float.

The manner in which the above-described mechanism operates is as follows: Ground coffee is placed in dripper $a$ on strainer $s$ by lifting out perforated plate $d$, which is afterward returned to its place. The dripper is placed on pot A, and in doing so conduits or pipes P and P' are connected, so as to afford a continuous passage. The pot is now placed on boiler B, the lower end of pipe or conduit P engaging nipple $e$, thus giving a continuous passage from interior of boiler to top of pipe P'. Water is poured into the boiler through pipe $w$, and as the water-level in the boiler increases in height it raises float F until finally the float F comes in contact with lower end of supply-pipe $w$, closing it. Cap D is then placed on top of pipe $w$. Lever M is raised, opening gas-cock $i$, the gas lighted, and lever M rested against lower part of bell-lever $r$. From now on until completion of process the mechanism operates automatically. The steam generated in boiler B gradually increases in pressure until strong enough to force the boiling water up through escape-pipe E. In passing up this pipe the water raises or opens valve $v$. This allows the escape of live steam through one or more openings $u$ and $u'$, thereby causing such a reduction in steam-pressure that the valve $v$ closes, thus interrupting the flow of water until the steam again rises to pressure necessary to force more water up the escape-pipe strong enough to again open valve $v$, whereupon live steam again escapes and the pressure is again reduced below the point necessary to keep the valve open. Consequently it closes, causing another interruption in flow of water. This operation is kept up until all the water in the boiler above lower end of escape-pipe E is forced out. When the water-level descends below lower end of escape-pipe, steam only passes out. After a sufficient quantity of steam has blown through pipes or conduits P and P' to carry out all the water which might be left in such pipes or conduits then float F, descending with the water-level on which it floats, will have reached such a point that through lever L' will raise bar or rod R sufficiently high to release it from contact with projection or heel on lower end r of bell-lever, thus causing the upper end of this lever to swing around and strike gong G, indicating that the process is completed. The release of bell-lever, as just stated, operates to release lever M, which swinging downward extinguishes the gas or lamp flame, as aforesaid. At the same time lever M strikes gong G'. This last-mentioned gong is sufficient without bell-lever q r and gong G on boiler, which may be dispensed with when mechanism is used as illustrated; but boiler B may be used with vessels A and a without the heating mechanism shown—this by placing it on any stove or other heating apparatus, in which event the signal apparatus attached to boiler would prove of much convenience in indicating when the process is completed, giving notice in time to shut off the flame or remove the boiler, so as to prevent the boiler from being burned from lack of water. The combination of conduits or pipes P and P' with vessels A and a does not prevent the use of these two vessels in the manner now used if circumstances at any time should so require.

In making tea, vessel a is dispensed with and cover c placed on vessel A. The sleeve H, in combination with escape-pipe E, is turned so as to close openings u and u'. By thus shutting off the escape of live steam, as aforesaid, when the water commences to flow up through escape-pipe E under pressure the flow is practically constant until the process is completed. However, in this process also the interrupted flow may be had, as above stated.

What I claim as my invention, and desire to secure by Letters Patent, is as follows, to wit:

1. In an infuser, the combination of a boiler provided with a water-inlet and a float for closing the same, a burner, an alarm, an infusing-pot communicating with the boiler near the bottom thereof; and means set in operation by said float to extinguish the burner and sound the alarm when the float falls, substantially as described.

2. In an apparatus for making tea or coffee, the combination of the tea-receptacle provided with a pipe, said pipe having a discharge-opening near its top, a removable coffee-receptacle, adapted to rest upon the tea-receptacle, and provided with a pipe, a sleeve adapted to couple together said pipes and to close said discharge-opening and means for forcing water through said pipes.

3. In an apparatus for making tea or coffee the combination of a boiler, an infuser, an escape-pipe communicating with the boiler and provided with openings, a rotatable sleeve provided with a valve and openings, said openings adapted to be brought into communication with the openings of the escape-pipe, and means for conducting the water from the rotatable sleeve into the infuser.

JOHN D. GRACE.

Witnesses:
   E. DANTONET,
   J. H. WARNER.